United States Patent

Bove et al.

[11] Patent Number: 6,079,091
[45] Date of Patent: Jun. 27, 2000

[54] VALVE ASSEMBLY TOOL

[75] Inventors: Nelson David Bove, Cincinnati; William Allen Scott, Fairfield; Albert Michael Tabben, West Chester, all of Ohio

[73] Assignee: Ford Global Technologies, Inc., Dearborn, Mich.

[21] Appl. No.: 09/174,651

[22] Filed: Oct. 19, 1998

[51] Int. Cl.[7] .................................................. B23P 19/04
[52] U.S. Cl. ................................................. 29/213.1
[58] Field of Search .................................. 29/213.1, 214, 29/215, 890.124, 464; 294/64.1

[56] References Cited

U.S. PATENT DOCUMENTS

| | | |
|---|---|---|
| 2,094,043 | 11/1937 | Marshall . |
| 4,078,671 | 3/1978 | Lundstrom . |
| 4,762,354 | 8/1988 | Gfeller et al. . |
| 4,763,941 | 8/1988 | Sniderman . |
| 4,815,779 | 3/1989 | Glessner et al. ............................ 29/743 |
| 4,850,780 | 7/1989 | Safabakhsh et al. ....................... 29/743 |
| 4,852,247 | 8/1989 | Hawkswell . |
| 4,995,662 | 2/1991 | Hawkswell . |
| 5,113,581 | 5/1992 | Hidese ....................................... 29/743 |
| 5,374,091 | 12/1994 | Gore et al. . |
| 5,456,007 | 10/1995 | Bove et al. . |
| 5,542,726 | 8/1996 | Ozawa ....................................... 29/743 |
| 5,572,785 | 11/1996 | Tveit . |
| 5,694,964 | 12/1997 | Bloomfield et al. . |

FOREIGN PATENT DOCUMENTS

| | | |
|---|---|---|
| 241 391 A1 | 12/1986 | Germany . |
| 258 787 A1 | 8/1988 | Germany . |
| 1360873 | 12/1987 | Russian Federation . |
| 1407802 | 7/1988 | Russian Federation . |
| 1442400 | 12/1988 | Russian Federation . |
| 1193921 | 2/1969 | United Kingdom . |

Primary Examiner—Robert C. Watson
Attorney, Agent, or Firm—Frank G. McKenzie

[57] ABSTRACT

A tool is provided for locating and inserting a pair of bodies into a valve bore. One of the bodies has an inside diameter and the second body has an outside diameter for locating the bodies, respectively. The tool has a male locator for locating to the inside diameter provided on the first body. The tool also has a female locator for locating to the outside diameter of the second body.

12 Claims, 2 Drawing Sheets

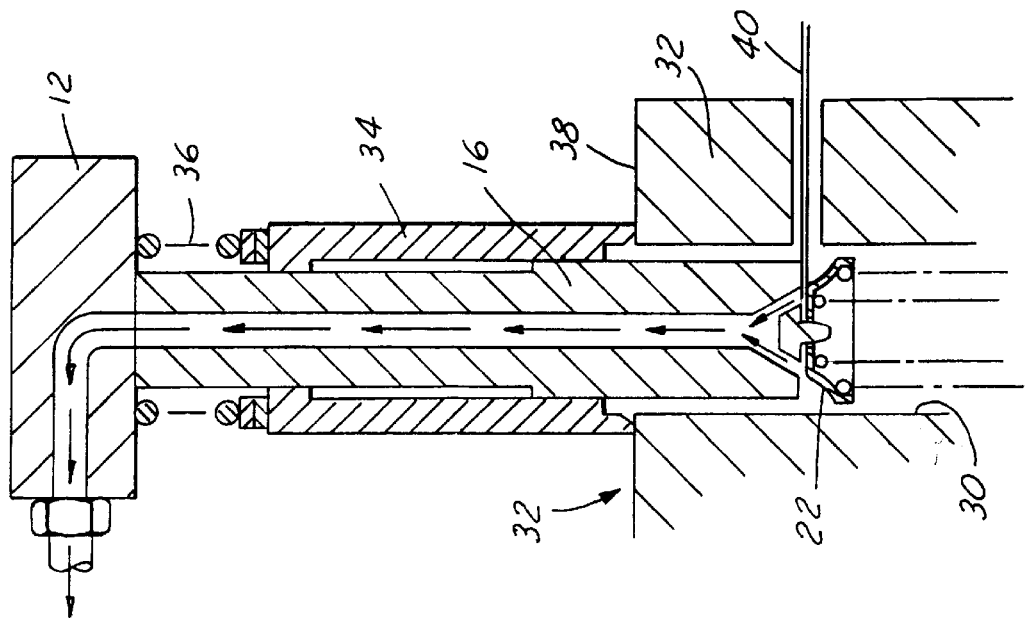
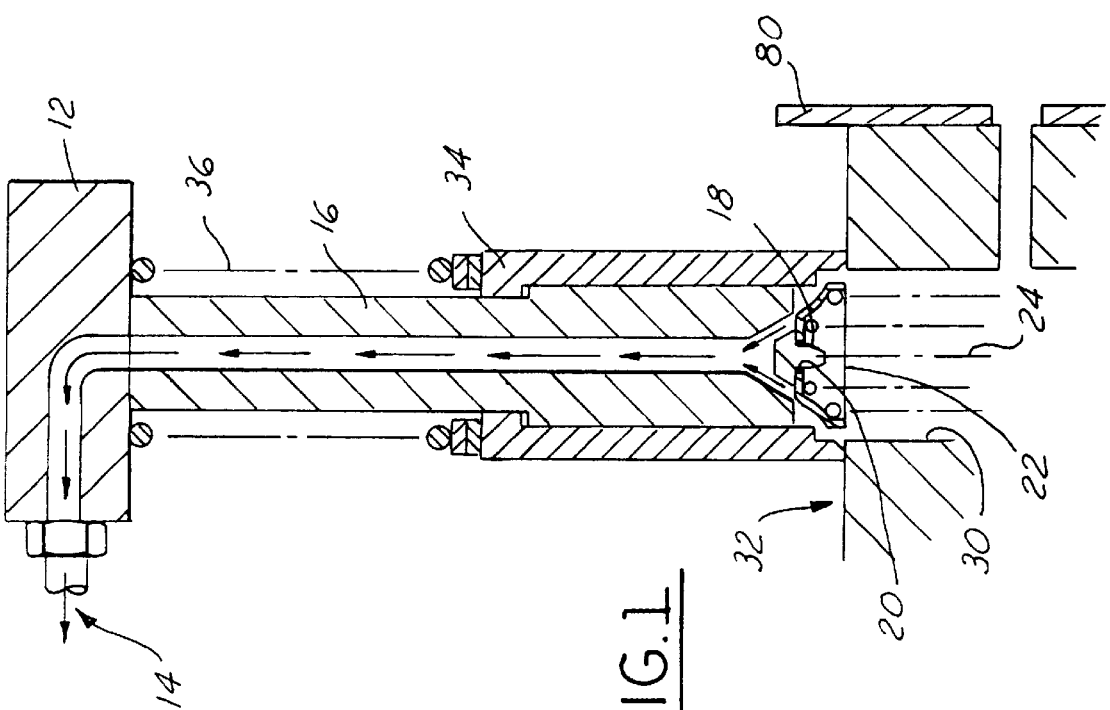

VALVE ASSEMBLY TOOL

FIELD OF THE INVENTION

The present invention relates to a tool for assembling the components of a valve into a bore provided in the valve.

BACKGROUND OF THE INVENTION

In U.S. Pat. No. 5,456,007, assigned to the assignee of the present invention, a method and apparatus are disclosed for fitting close tolerance valves into bores. This device requires several robot heads or other means for assembling the various components, as one robot is provided for inserting one component into the valve bore. This may require a large investment in equipment and may require a large amount of space to house several robots.

It would therefore be desirable to provide tooling capable of handling a variety of components and thereby reduce the number of tools required to assemble such a valve and the amount of space required therefor.

SUMMARY OF THE INVENTION

In accordance with the above objects, a tool is provided for locating and inserting a pair of bodies into a valve bore. One of the bodies has an inside diameter and the second body has an outside diameter for locating the bodies, respectively. The tool has a male locator for locating to the inside diameter provided on the first body. The tool also has a female locator for locating to the outside diameter of the second body. Thus, a single tool is provided to pick two members having differing sizes and/or shapes.

BRIEF DESCRIPTION OF THE DRAWINGS

FIG. 1 is a partial sectional side view of an apparatus according to the present invention;

FIG. 2 is the apparatus of FIG. 1 inserting a first component into a valve body;

DETAILED DESCRIPTION OF THE PREFERRED EMBODIMENTS

Figures 3, 4:
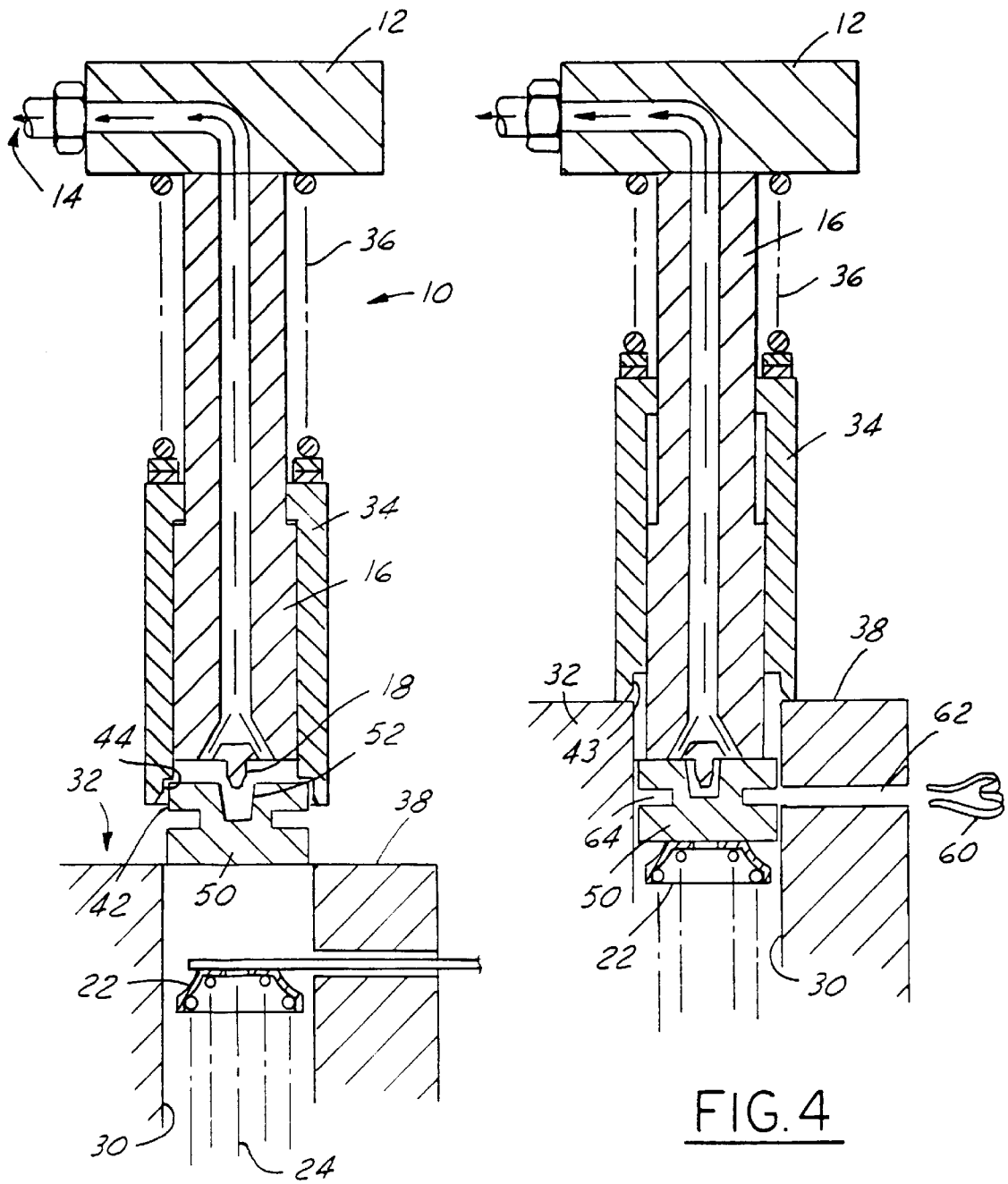
FIG. 3 is the apparatus of FIG. 1 picking up a second component to be installed into the body.
FIG. 4 is a sectional side view of the apparatus of FIG. 3 inserting the second component into the valve body.

As described in U.S. Pat. Nos. 5,456,007 and 5,694,964, which are incorporated herein by reference in their entirety, a valve body is held by a fixture and several components are assembled into a bore of the valve body. As illustrated in FIG. 1 of the present application, a tool 10 is connected to a robot head 12 for installing components into a valve body 32. The valve body is held by a fixture 80, preferably in a manner similar to that described in the '007 patent. The tool 10 includes a vacuum source 14 in communication with a male tool 16 with a male projection 18 extending from a first end thereof. The male tool 16 communicates vacuum to a first component 22 in order to lift the first component 22 to the tool 10. The first component 22 is then installed by the tool 10 into a bore 30 provided in a valve body 32. In this illustrative embodiment, the first component 22 comprises an umbrella spring, a component of a valve body of an automotive transmission as is well known in the art and therefore not described herein in detail. One skilled in the art appreciates that the components described herein are for illustrative purposes and not limiting.

The projection 18 of the male tool 16 is sized to preferably have a slight clearance fit with the bore 20 so as to radially locate the first component 24 with respect to the axis 24 of the tool. The clearance permits release of the first member 22 when the vacuum is released from the tool 16. Alternatively, a slight interference fit could be utilized and thereby reduce the vacuum needed and improve the location of the member 22. However, the interference must be controlled so the member 22 is freely removed from the tool 16 and not jam. Furthermore, as described in the '007 patent, a vacuum may be used through the valve body 32 to pull the member 22 from the tool 16.

As illustrated in FIG. 2, the tool 10 inserts the first member 22 into the bore 30 of the valve body 32. When the male member 16 is inserted into the bore 30, a female portion 34 of the tool comes into contact with a surface 38 of the valve body 32. This contact may help square the tool 16 with the surface 38 of the valve body and thereby keep the axis 24 of the tool 16 in coaxial alignment with the bore 30 and therefore facilitate insertion of the member 22. A compression spring 36 on the tool 10 is compressed as the male member 16 is inserted into bore 30 and the female portion 34 bears against the surface 38 and the male member 16 moves axially with respect thereto. Once the first member 22 is positioned as desired axially with respect to the valve body 32, a hold-down tool 40, preferably in the form of a fork, is inserted through a slot in the body 32 to maintain the axial position of the first member 22 with respect to the body 32 within the bore 30. The male member 16 is then extracted from the bore 30 and the tool 10 is then utilized to pick up a second member 50, as illustrated in FIG. 3 in the form of a plug.

FIG. 3 illustrates the second member 50 as a plug inserted into the bore 30 of the valve body 32. The second member 50 preferably includes a hole or depression 52 having a clearance fit to the projection 18 on the male member 16. Thus, the projection 18 does not serve to locate the second member 50. The second member 50 preferably has an outside diameter 42 having a slight clearance fit to an inside diameter 44 of the female member 34. The female member 34 thus locates the second member 50 with respect to the axis 24 of the tool. The vacuum source 14 is communicated through the male tool 16 to pick the second member 50. As the second member 50 is inserted into the bore 30, and the second member 50 comes into contact with the hold-down 40. The hold-down 40 is then withdrawn from the body 32 and the second member 50 serves to hold the first member 22 in place, as shown in FIG. 4. As was described above with respect to FIG. 2, and as is shown in FIG. 4, the spring 36 is compressed as the female tool member 34 comes in contact with the surface 38 of the valve body 32 while the male tool 16 is inserted into the bore 30. As the second member 50 is positioned within the bore 30, a retainer 60 is inserted through a slot 62 in the valve body 32 and engages a circumferential groove 64 provided in the second member 50 to axially retain the second member 50 and first member 22 within the bore 30, in a manner similar to that described in the '007 patent.

Although not shown here, one skilled in the art readily appreciates the inside diameter 44 of the female member 34 could comprise a plurality of stepped recesses to accommodate a variety of members having various outside diameters.

In a preferred embodiment, the inside diameter 44 has a frusto-conical shape, or at least a chamfer 43 to accommodate variation in the second member 50 or a variety of members 50 having different size outside diameters. The chamfer 43 assists to center the member 50 to the tool 10 and therefore improve the accuracy of positioning the member 50 within the bore 30. For example, the tool 10 will pick up a part 50 from a conveyor. If the part 50 is not located precisely on the conveyor, the tool 10 may not be able to accurately pick up the part 50 unless the tool 10 includes a chamfer 43 as described above. Likewise, the projection 18 preferably has a stepped or tapered shape to accommodate a variety of inside diameters and variation in positioning of the members 22, 50. However, the members 22, 50 to be picked up must be designed to clear the projection 18 and have adequate exposure to the vacuum 14 as provided in this tool to be picked and placed by this device.

In an alternative embodiment, the vacuum source 14 is replaced by a magnet (not shown). Although not shown here, one skilled in the art would appreciate that the male member 16, for example, could be magnetized so as to magnetically pick one or more of the components to be assembled. One skilled in the art further appreciates that this is dependent upon the material of the components to be picked and assembled.

The present device is also useful in an application similar to that described in the '007 patent where the vacuum source 14 is withdrawn when the component is positioned adjacent to the valve bore, or a vacuum within the bore 30 overcomes the vacuum 14 of the tool 10. The advantage of the present invention is that instead of requiring a unique tool to pick each of the components described in the '007 patent, the present invention uses a single tool to position several of these components. This permits a reduced investment in robots and less space is required for the assembly of the valve.

In an alternative embodiment, as described in the '007 patent, the robot may also be used to place a spool valve. As described in the '007 patent, the arm may move in a rotary spiral orbit over the bore 30 and a vacuum applied to the valve body to suck the component into the bore 30. Likewise, many similar components may be placed by the present invention. In another embodiment, the male tool 16 is magnetically attractive in addition to the vacuum source. In this embodiment, the magnet may be used to pick items, such as a spring, which is not easily picked by a vacuum source. The other components, such as a plug 50 is then picked using the vacuum.

Although described above with respect to diameters, such as 42 and 44, one skilled in the art appreciates a non-circular dimension may equivalently be located by a tool according to the present invention (such as a square, etc.).

While certain embodiments of the present invention have been described in detail, those skilled in the art to which the invention relates will recognize various alternative designs and embodiments for practicing the present invention as defined by the following claims.

We claim:

1. A tool for locating and inserting a first body having an inside diameter and a second body having an outside diameter, comprising:
   a male locator having an outside diameter for locating to the inside diameter provided on the first body; and
   a female locator axially aligned and moveable relative to the male locator and having an inside diameter for locating to the outside diameter of the second body;
   a compression spring disposed about a portion of the male locator and between the female locator and the male locator to axially urge the female locator into axial alignment with the male locator.

2. A tool according to claim 1 wherein the tool is connected to a vacuum source for alternately holding the bodies.

3. A tool according to claim 1 wherein the inside diameter of the female locator is larger than an outside diameter of the first of the bodies.

4. A tool according to claim 3 wherein the tool is connected to a vacuum source for holding the bodies.

5. A tool for locating and inserting a first body having an inside diameter and a second body having an outside diameter, comprising:
   a male locator having an outside diameter for locating to the inside diameter provided on the first body;
   a female locator having an inside diameter for locating to the outside diameter of the second body;
   the locators being axially aligned and the female locator being moveable with respect to the male locator;
   the female locator being axially spring biased for axial alignment with the male locator; and
   wherein the locators magnetically attract the bodies for holding the bodies.

6. A tool for locating and inserting a first body having an inside diameter and a second body having an outside diameter, comprising:
   a male locator having an outside diameter for locating to the inside diameter provided on the first body;
   a female locator having an inside diameter for locating to the outside diameter of the second body;
   the inside diameter of the female locator being larger than an outside diameter of the first of the bodies; and
   wherein the locators magnetically attract the bodies for holding the bodies.

7. A device for installing a spring and a plug into a valve body, the device comprising:
   a machine having an arm moveable with respect to an axis;
   a first tool having a surface with an outside diameter sized to locate one of the spring and plug and for clearance to the other of the spring and plug, the first tool held by the arm for movement therewith along the axis;
   a second tool axially alignment and moveable relative to the first tool and having an inner surface with an inside diameter for locating the other of the spring and plug, the second tool axially aligned with the first tool and held by the arm for movement therewith along the axis; and
   a compression spring disposed about the first tool and between the first tool and the second tool to axially urge the second tool into axial alignment with the first tool.

8. A device according to claim 7, wherein the first tool locates the plug radially with respect to the arm, the outside diameter of the first tool being sized to fit inside a bore of the valve body to install the plug therein and the inside diameter of the second tool being sized so that the second tool contacts the valve body when the first tool is inserted into the bore.

9. The device according to claim 8, wherein the tool is maintained in substantial axial alignment with the bore through the contact of the second tool with the valve body.

10. A device for installing a spring and a plug into a valve body, the device comprising:
   a machine having an arm moveable with respect to an axis;
   a first tool having a surface with an outside diameter sized to locate one of the spring and plug and for clearance to the other of the spring and plug, the first tool held by the arm for movement therewith along the axis;

a second tool having an inner surface with an inside diameter for locating the other of the spring and plug, the second tool axially aligned with the first tool and held by the arm for movement therewith along the axis;

the second tool being axially moveable with respect to the first tool;

the second tool being axially spring biased away from the arm;

wherein the first tool locates the plug radially with respect to the arm, the outside diameter of the first tool being sized to fit inside a bore of the valve body to install the plug therein and the inside diameter of the second tool being sized so that the second tool contacts the valve body when the first tool is inserted into the bore; and wherein the inside diameter of the second tool has a frusto-conical shape.

11. The device according to claim 10 wherein the machine includes a vacuum source provided through the male tool for alternatively holding the spring and plug axially with respect to the arm.

12. A device for installing a spring and a plug into a valve body, the device comprising:

a machine having an arm moveable with respect to an axis;

a first tool having a surface with an outside diameter sized to locate one of the spring and plug and for clearance to the other of the spring and plug, the first tool held by the arm for movement therewith along the axis;

a second tool having an inner surface with an inside diameter for locating the other of the spring and plug, the second tool axially aligned with the first tool and held by the arm for movement therewith along the axis;

wherein the second tool being axially moveable with respect to the first tool;

the second tool being axially spring biased away from the arm;

wherein the first tool locates the plus radially with respect to the arm, the outside diameter of the first tool being sized to fit inside a bore of the valve body to install the plug therein and the inside diameter of the second tool being sized so that the second tool contacts the valve body when the first tool is inserted into the bore; and wherein the machine includes a magnet for alternatively holding the spring and plug axially with respect to the arm.

* * * * *